(12) United States Patent
Lye et al.

(10) Patent No.: US 6,408,032 B1
(45) Date of Patent: Jun. 18, 2002

(54) TRANSMIT BASELINE WANDER CORRECTION TECHNIQUE

(75) Inventors: William Lye, Burnaby; Anthony B. Candage, Port Moody, both of (CA)

(73) Assignee: PMC-Sierra Ltd., Burnaby (CA)

( * ) Notice: Subject to any disclaimer, the term of this patent is extended or adjusted under 35 U.S.C. 154(b) by 0 days.

(21) Appl. No.: 09/163,340

(22) Filed: Sep. 30, 1998

(51) Int. Cl.[7] .......................... H04B 3/00; H04L 25/03; H03L 5/00
(52) U.S. Cl. ..................... 375/257; 375/258; 375/295; 375/296; 327/307
(58) Field of Search ................ 375/257, 258, 375/295, 296, 254, 317, 318, 319, 377; 327/72, 73, 307; 333/177, 178, 24 R; 455/63

(56) References Cited

U.S. PATENT DOCUMENTS

| | | | |
|---|---|---|---|
| 4,472,800 A | * | 9/1984 | Krym et al. ............... 370/294 |
| 4,641,324 A | * | 2/1987 | Karsh et al. ............... 375/317 |
| 6,160,851 A | * | 12/2000 | Brown et al. ............... 375/257 |

* cited by examiner

Primary Examiner—Betsy L. Deppe
(74) Attorney, Agent, or Firm—Harold C. Baker; Robert A. Wilkes; Robert G. Hendry

(57) ABSTRACT

A circuit for correcting baseline wander in a transmitter which includes a main signal current driver driving a first winding of a two-winding transformer which first winding is in parallel with a termination impedance matching load, in which a compensation current driver is coupled in parallel with the main signal current driver for adding its current to current of the main signal current driver. A correction signal control input is provided to the compensation driver. A sample-and-hold circuit is connected across the first winding, an error amplifier having a first pair of inputs is connected across the first winding and a second pair of inputs are connected to the output of the sample and hold circuit. These provide an error signal resulting from a difference of signals appearing at its respective pairs of inputs. A circuit is provided for applying the error signal to the correction signal control input of the compensation current driver, whereby any difference between a present signal carried by the first winding of the transformer, and a past signal held by the sample-and-hold circuit, results in an error signal and generation of a correcting current by the compensation current driver so as to substantially eliminate the difference.

9 Claims, 4 Drawing Sheets

TRANSMIT BASELINE WANDER CORRECTION TECHNIQUE

FIELD OF THE INVENTION

This invention relates to the field of digital data transmission, and particularly to a method of compensating for baseline wander in a transformer coupled transmission link.

BACKGROUND TO THE INVENTION

When transmitting data from a transmitter to a receiver, bandpass limitations can cause a phenomenon called baseline wander, which is the shifting of a central e.g. neutral, voltage or current value about which data signal excursions occur, positively or negatively from the proper neutral or central value. As will be described below, this can cause jitter or data loss.

With reference to FIG. 1, a schematic diagram is shown as a Norton equivalent circuit, which includes a transmitter 1 comprising a current driver, which may, depending on the network standard, be as simple as an on/off switch or as complex as a linear driver or a Digital-to-Analog Converter (DAC). A receiver 3 (shown as an amplifier) may be as simple as an error amplifier or as complex as a full analog adaptive equalizer. In general, both the transmitter and receiver are terminated by resistances that match the characteristic impedance of twisted-pair cabling 5 which is connected between transformers 7 and 9 which couple to the transmitter 1 and receiver 3. The transformers are included both to block DC currents and to minimize common-mode coupling from the transmitter onto the cabling, thus minimizing EMI radiation from the system.

In an AC-coupled data transmission systems such as that of FIG. 1, there often is the possibility of a phenomenon called Baseline Wander, also called BLW. It is caused by the high-pass nature of the AC coupling, and appears as a data-dependent drift of the theoretical zero-crossing point of the data over time. FIG. 2 shows the effects of BLW for Non-Return to Zero (NRZ) data.

The top trace in FIG. 2 is the ideal differential signal that would be expected by the receiver without AC coupling. The second trace shows how this is actually encoded as a pair of differential signals arriving at the receiver. The third trace shows the effects of AC coupling on these differential receiver inputs; as the data pattern density moves from balanced data on the left to unbalanced data (more −1's than +1's), the signals will start to collapse toward one another. As a result, the overall differential signal's baseline will wander, as shown in the final trace.

For non-return to zero (NRZ) data, where there is only a single threshold required to determine whether the signal transmitted was a +1 or a −1, the effects of BLW are comparatively minor. If the receiver slices the data using a slightly wrong threshold, the only effects appear as edge jitter. For multi-level (Pulse Amplitude Modulated or PAM) codes, however, where there are multiple thresholds required to resolve the transmitted symbol, the effects can be catastrophic and result in data errors. As a result, compensation for BLW becomes important.

BLW may be somewhat controlled by maximizing the open-circuit-inductance (OCL) of the transformers used. However, transformers act as band-pass filters. The low-frequency cutoff is controlled by an induction/resistance L/R time constant, where L is the OCL. A larger L provides a lower frequency cutoff.

The high-frequency cutoff is controlled by the coupling coefficient of the transformer and the same L/R time constant. An ideal transformer has a coupling coefficient K of 1, while real transformers have a coupling coefficient somewhat smaller than, but still close to, 1. The high-frequency corner of the bandpass response has a proportional $1/(1-K^2)$ term in it, so the closer K is to 1, the higher frequency this corner is. It is difficult to manufacture transformers with wide frequency responses (i.e. K close to 1), so when attempting to transmit high data rates, designers are forced to use transformers with the minimum OCL that they can. As a result, designers are competing against two mutually exclusive requirements: high speed requires low OCL's, while BLW immunity requires larger OCL's or more expensive transformers. By compensating for BLW somewhere other than in the transformer, the designer is free to use less expensive low-inductance transformers to achieve high speeds.

The simplest way to compensate for BLW is to choose a transmission coding scheme to remove all spectral components from the transmitted data that are below the high-pass limit of the transformer coupling. Among others, transmit line coding techniques known as Return-to-Zero Alternate Mark Inversion (RZ-AMI), Modified Frequency Modulation (MFM, also known as Manchester Coding), and the technique described in U.S. Pat. No. 5,200,979 all do this at the expense of increased bandwidth or required signal to noise ratio (SNR). The MLT3A technique described in U.S. Pat. No. 5,655,078 also removes low-frequency spectral components, but re-uses the increased SNR required by MLT3 and so is not quite as expensive as the other techniques.

Another way to compensate for BLW is to scramble the data with a known Pseudo-Random Bit Sequence (PRBS) before transmitting it, then descramble it at the receiver. This technique is based entirely on statistical arguments based on the length of the PRBS sequence, since there is a small but finite probability that transmitted data will exactly match up to the inverse of the PRBS sequence over a long enough period of time to induce a BLW event.

In the Fiber Distributed Data Interface (FDDI) standard, there is a known valid "killer packet", that, if transmitted, will induce a BLW event that will break the network in the absence of BLW correction. Other standards, such as 155Mbit/s ATM and 100 BaseT Ethernet may also suffer from BLW "killer packets", but this is a matter of some debate.

Yet another way to compensate for BLW is to include BLW correction circuitry in the receiver. This requires that there be circuitry built to detect the BLW event and add an offset to compensate. Depending on the complexity of the rest of the equalizer, this may be easy or difficult. As an example of the trade-offs required, FIGS. 3A, 3B and 3C show three possible BLW correction loop configurations with an adaptive equalizer 11 receiver. The first, in FIG. 3A, shows a BLW correction loop 13 applied before equalization. This is, in theory, the simplest to conceive; however the BLW correction algorithm in the loop needs to extract information from the signal before the equalizer, so any correction algorithm that assumes a known decision out of the equalizer is impossible.

The second configuration, as shown in FIG. 3B, wraps the BLW correction loop 13 around the adaptive equalizer 11, in effect embedding the adaptive equalization loop as an inner loop of the BLW loop. It has the advantage over the first configuration in that now the BLW correction algorithm may use the information coming out of the equalizer as its input. However embedding the adaptive algorithm loop as part of the BLW loop makes stability analysis of the BLW loop challenging.

The third configuration shown in FIG. 3C puts the BLW correction 13 after the adaptive equalizer 11. This has none of the difficulties of the first or second configuration, but requires that the entire equalizer have an increased dynamic range (as much as twice if the transformer voltages completely decay) to accommodate the extremes of a BLW event. As supply voltages are reduced with smaller-geometry microelectronic processes, this linearity becomes harder and harder to accomplish.

Yet another technique i$ to include BLW correction circuitry into the transmitter. Because in this technique the BLW correction circuitry is a single loop, not wrapped around an adaptive equalizer, it is much simpler to analyze and design than the receiver BLW correction circuitry of FIG. 3B. At the same time, because the transmitter comes before the cable 5, the BLW correction algorithm already has information about what signal is being transmitted and doesn't have the difficulties of the design of FIG. 3A. Finally, since the transmitter minimizes the BLW of its output, the receiver needs only enough dynamic range to accommodate the signal. It does not need the excess dynamic range required by the circuit of FIG. 3C.

Reference is made to U.S. Pat. No. 5,655,078 by Paul M. Anderson et al, issued Aug. 5, 1997. This patent describes MLT3A, a variant of MLT3, in which a memory is kept of the transmitter's history and an attempt is made to ensure a long-term balance of +1's and −1's on the cable, thus minimizing BLW. It is, however, an open-loop solution and is not easily generalized to other line coding techniques.

Reference is also made to U.S. Pat. No. 5,465,272 by Robert W. Smith, which describes a system readily generalized to a wide number of line coding techniques. It embodies a single loop in the transmitter, using a ternary winding on the transmit transformer to sense the signal being transmitted on the line. It then compares the sensed signal to the idealized transmitted signal, and then applies a correction signal to suppress any BLW present in the output. A practical implementation of the concept shown in FIG. 2A of the patent is shown in FIG. 4 herein.

The main driver 15 and correction driver 17 are controllable current sources whose outputs sum to drive an off-chip resistor 19, the primary winding of transformer 21, and via the secondary winding, the twisted-pair cable 5. A reference driver 23 (matched to driver 15) and an on-chip resistor 25 (matched to resistor 19, the transformer 21, the cable 5 and the far-end receiver termination) generate an ideal on-chip output voltage without baseline wander. A ternary winding of the transformer 21 and a second off-chip resistor 27 connected across the ternary winding sense the voltage on the line and any BLW on it. Error amplifier 29 compares the reference output to the sensed voltage on the line, then, through low pass filter 31, drives correction driver 17 to correct for the BLW at the outputs.

The cost associated with adding the transmit baseline wander correction circuitry of FIG. 4 to the circuitry of FIG. 1 has several components. A simple transmitter without BLW correction only consists of driver 15, resistor 19, and a two-winding transformer 7. Adding transmit BLW correction requires elements 17, 29, 31, 23, 25 and 27 and a three-winding transformer 21. Elements 17, 29, 31 and 23 together with element 25 are all on-chip and as a result cost power and on-chip layout area, but can have a low dollar cost. Resistor 27 has a low dollar cost, but doubles the printed circuit board area taken up with transmitter termination resistors and increases the power that the chip needs to drive into off-chip circuitry. The three-winding transformer 21 is larger and occupies more printed circuit board area than a two-winding transformer. Because of a lack of economies of scale, the three-winding transformer would also be significantly more expensive than the much more common and easier to obtain two-winding alternative.

In addition, the sensing feedback path from the transformer back to the chip is an additional high-speed path that would have to be made with controlled-impedance printed circuit board traces, doubling the board area taken up with transmitter signal routing. Finally, the sensing feedback path requires two additional chip pins, which on a multi-channel device can be a significant additional cost and may force the chip into a larger and more expensive package.

The on-chip costs (elements 17, 29, 31, 23 and 25) are, for the most part, easier to justify than the off-chip costs. Because lumped series resistance of the twisted-pair cable limits the low-frequency correction possible by this technique, driver 17 can be made significantly smaller than driver 15, both in power and area. Driver 23 and resistor 25 can be scaled copies of driver 15 and resistor 19, reducing their power and area. Because of the limited bandwidth required, error amplifier 29 can be made small and low-power, while the corner frequency of filter 31 does not have to be particularly accurate. There is, however, an additional major problem. Because lumped series resistance of the cable (or mismatches in the transmit or receive terminations) will introduce a gain error in the feedback path, either driver 23 or resistor 25 needs to be variable with an adaptation loop to compensate for this gain error. If this is not done, this BLW correction loop will, in effect, introduce BLW where there was none before. This adaptation loop would need to monitor the incoming data stream, looking for a long run of balanced data which will have minimal BLW when transmitted. It then must disable the BLW correction loop and trim driver 23 or resistor 25 as necessary to match the amplitudes transmitted to those received, and then re-engage the BLW correction loop, remembering the trimmed value. This loop is fairly complex and will increase the on-chip complexity considerably. Nonetheless, the on-chip costs are small compared to the off-chip costs.

The off-chip costs (involving resistor 27, a more complex transformer 21, additional area taken up with routing, and the additional two pins) are significant and as a result would require that this style of transmit BLW correction have significant benefits in order to justify it.

SUMMARY OF THE INVENTION

If a transmit BLW correction loop could be designed which has substantially the same off-chip cost as the simple transmitter, it would be much more likely to be used. In addition, if the adaptive loop to compensate for lumped series resistance of the cable (or termination mismatches) can be simplified or removed, the correction technique would again be much more likely to be used.

The present invention provides a method and apparatus for providing baseline wander compensation in a transmitter which has substantially the same off-chip cost as the simple transmitter, and in addition, does not require the adaptive loop to compensate for lumped series resistance of the cable, or termination mismatches, required in the prior art circuit of FIG. 4. Only a two winding transformer is required. As such it provides a significant improvement thereof.

In accordance with an embodiment of the invention, a method of compensating for baseline data signal drift of an ongoing signal comprises sampling the signal and holding the sample, comparing the sampled signal with the ongoing signal at a time later than the sampling time and deriving a difference signal, and correcting the ongoing signal in a direction so as to substantially eliminate the difference signal.

Sampling is effected from the output signal, and the transformer is a two-winding transformer which need not have a ternary winding. Sampling can be done across the primary winding, or the secondary winding with appropriate coupling circuitry.

In accordance with another embodiment, a circuit for correcting baseline wander in a transmitter which is comprised of a main signal current driver driving a first winding of a two winding transformer which first winding is in parallel with a termination impedance matching load, comprises:

(a) a compensation current driver coupled in parallel with the main signal current driver for adding its current to current of the main signal current driver, and having a correction signal control input, (b) a sample-and-hold circuit connected across the first winding, (c) an error amplifier having a first pair of inputs connected across the first winding and a second pair of inputs connected to the output of the sample-and-hold circuit, for providing an error signal resulting from a difference of signals appearing at its respective pairs of inputs, and (d) a circuit for applying the error signal to the correction signal control input of the compensation current driver, whereby any difference of a present signal carried by the first winding of the transformer, with a past signal held by the sample-and-hold circuit, results in an error signal and generation of a correcting current by the compensation current driver so as to substantially eliminate the difference.

In accordance with another embodiment of the invention, a method of compensating for signal drift comprises applying an output signal and a representation of an input signal to respective inputs of an error amplifier, applying an error signal resulting from an output of the comparator to a control input of a signal compensation driver, generating the output signal from an input driver driven by the input signal and from the signal compensation driver, and applying the output signal to a single winding of a two-winding transformer.

In accordance with another embodiment of the invention, a circuit is provided for correcting baseline wander in a transmitter which is comprised of a main signal current driver driving a first winding of a transformer, (a) the transformer being restricted to having two windings, and further comprising:

(b) a termination impedance-matching load in parallel with the first winding of the two winding transformer (c) a compensation current driver coupled in parallel with the main signal current driver, having a correction signal control input, for adding its current to current of the main signal current driver, (d) a reference current driver having a control input coupled in parallel with a control input of the main signal current driver for receiving an input signal, (e) a reference resistor connected across the output of the reference current driver, (f) an error amplifier having a first pair of inputs connected across the first winding and a second pair of inputs connected across the output of the reference current driver, and (g) a circuit for applying the error signal to the correction signal control input of the compensation current driver.

BRIEF DESCRIPTION OF THE DRAWINGS

A better understanding of the invention will be obtained by a consideration of the detailed description below, in conjunction with the following drawings, in which.

DETAILED DESCRIPTION OF EMBODIMENTS OF THE INVENTION

Figure 5:
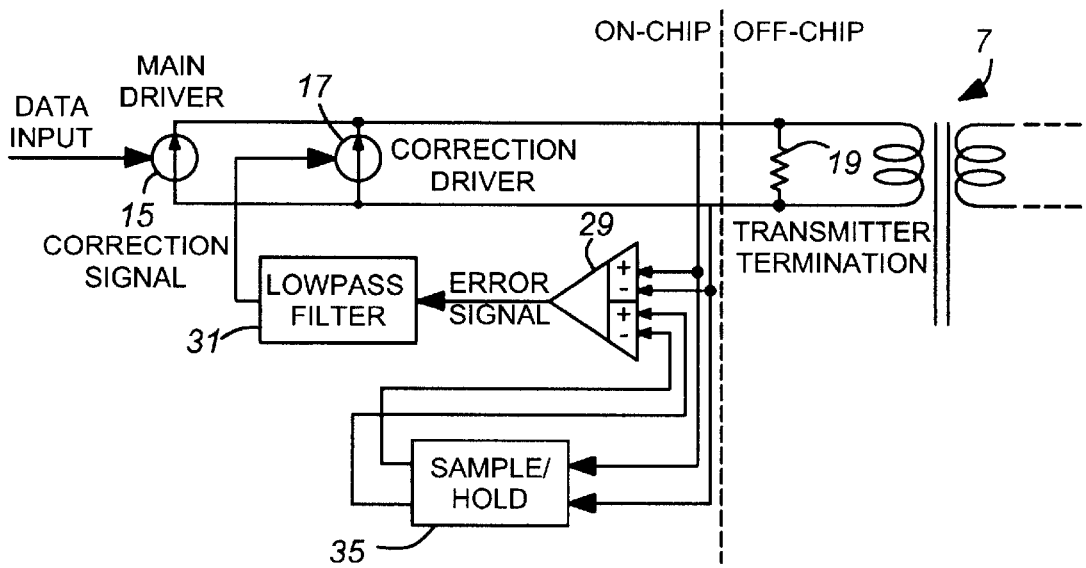
FIG. 5 is a schematic diagram of a transmitter baseline wander correction configuration in accordance with an embodiment of the invention.

Turning to FIG. 5, a main current driver 15 receives a digital data input signal at a control input, and drives a primary winding of a transformer 7, which winding is in parallel with a transmitter termination resistor 19. A correction (compensation) current driver 17 has a correction signal applied to its control input, the correction signal being derived from the output of error amplifier 29 via lowpass filter 31.

Figure 1:
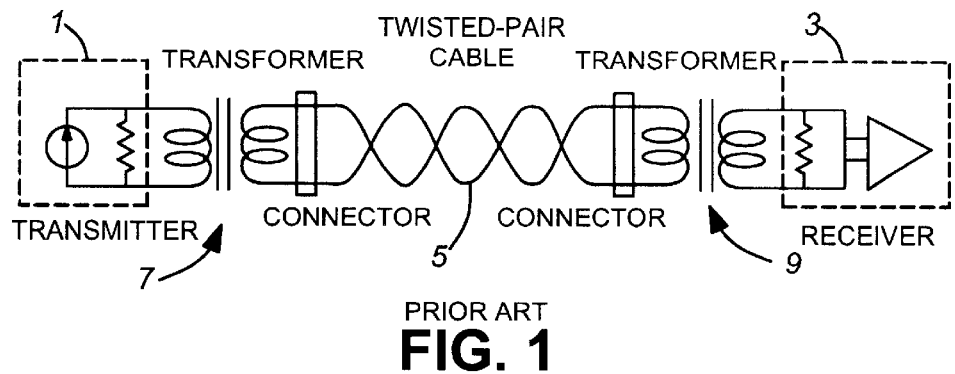
FIG. 1 is a Norton equivalent circuit of an uncompensated data transmission system in accordance with the prior art, FIG. 2 are waveforms of various signals illustrating baseline wander.
Figure 2:
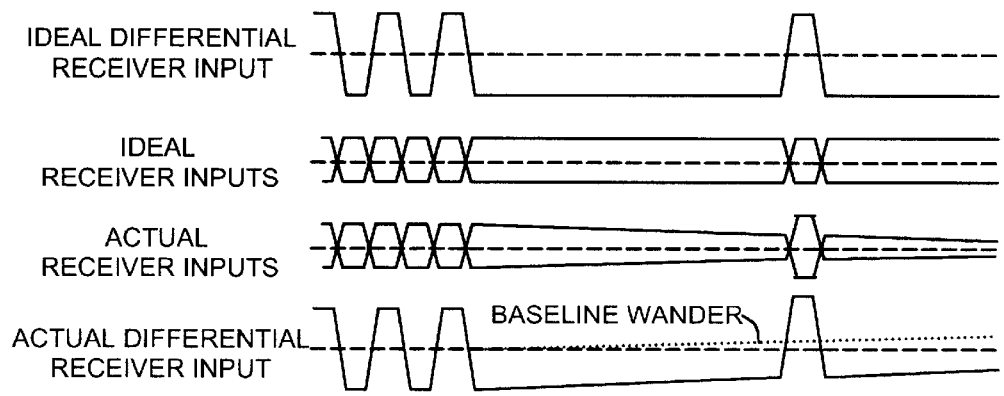
Figure 4:
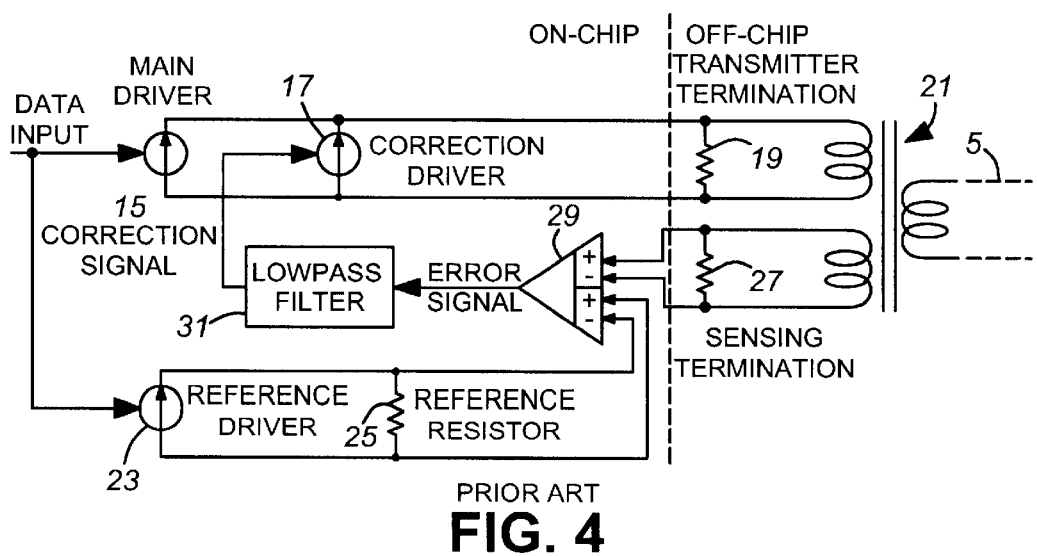
FIG. 4 is a schematic diagram of a transmitter baseline wander correction configuration in accordance with the prior art.

So far, except for the type of transformer used, the circuit is similar to that of FIG. 4.

However, in this embodiment of the invention, instead of one of the signals applied to a pair of inputs of the error amplifier 29, e.g. a comparator, being obtained from a ternary winding of the transformer, it is obtained from directly across the primary winding of the transformer. The same signal is applied to the input of a sample and hold circuit 35. The ongoing signal is thus sampled from time to time (preferably in sync with the input signal) and is held by circuit 35.

The output of the sample-and-hold circuit 35 is applied to the other pair of inputs of the error amplifier 29.

The signals compared in the error amplifier 29 are thus the ongoing signal and a sampled signal from some time ago. Any baseline wander will show as the difference or error signal at the output of the error amplifier 29, which is used to control the correction current driver 17.

In operation, the transmitted data is presented to the main driver 15, and a correction signal is presented to the correction driver 17. The two drivers' outputs sum and drive resistor 19, the transformer 17, and the cable which is coupled to the secondary winding of the transformer. Sample-and-hold circuit 35 (preferably synchronized to the data input) senses the output voltage of the transmitter, e.g. across resistor 19, and presents it to one input of the error amplifier 29. The other input to amplifier 29 is the raw transmitter output signal across resistor 19. The error signal is low pass filtered by filter 31 and the filtered signal is applied to driver 17. Because sample-and-hold circuit 35 is synchronized to the data input, it holds the output voltage between output transitions. If a BLW event occurs, the transmitter output signal drifts away from the held signal. This drift is amplified, filtered, then is applied to driver 17, thus canceling out the BLW.

We have discovered, in contrast to what was previously thought (that a ternary winding was required for sensing), that we may sense the receiver's voltage at the transmitter output, and that a BLW event at the receiver will also be seen and may be corrected for at the transmitter. We have also discovered that series resistance of the cable and termination mismatches will manifest themselves in the same manner as for the prior art circuit FIG. 4. The limit on the effective bandwidth improvement available is the same for the embodiment of FIG. 5 as for the circuit of FIG. 4. Because the embodiment of FIG. 5 uses a sample-and-hold circuit in place of a reference driver, it includes the effects of series cable resistance and any termination mismatches at the reference input to error amplifier 29. We have discovered that it is therefore immune to the effects of cable resistance and termination mismatches, and does not require the adaptation loop for the transmitter as is required for FIG. 4.

Figure 3A:
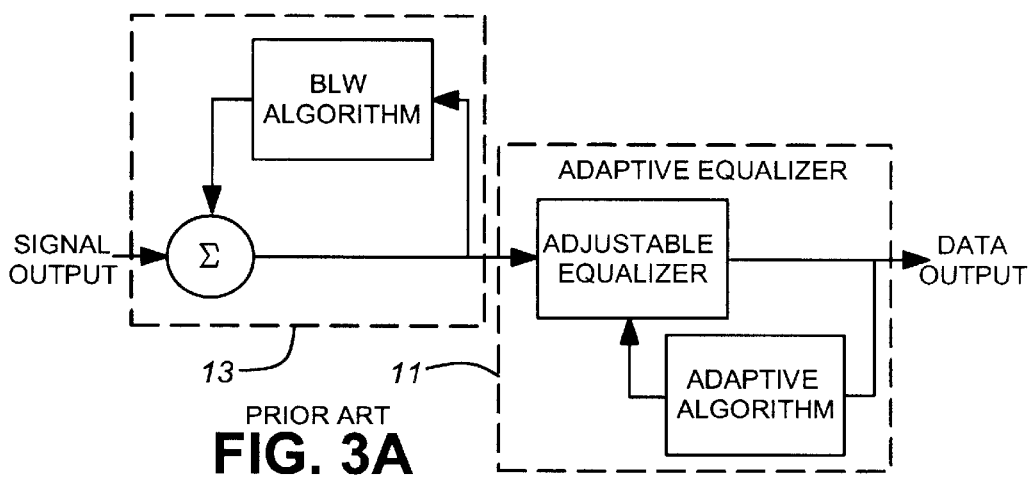
FIGS. 3A, 3B and 3C are block diagrams of receiver baseline wander correction configurations in accordance with the prior art.
Figure 3B:
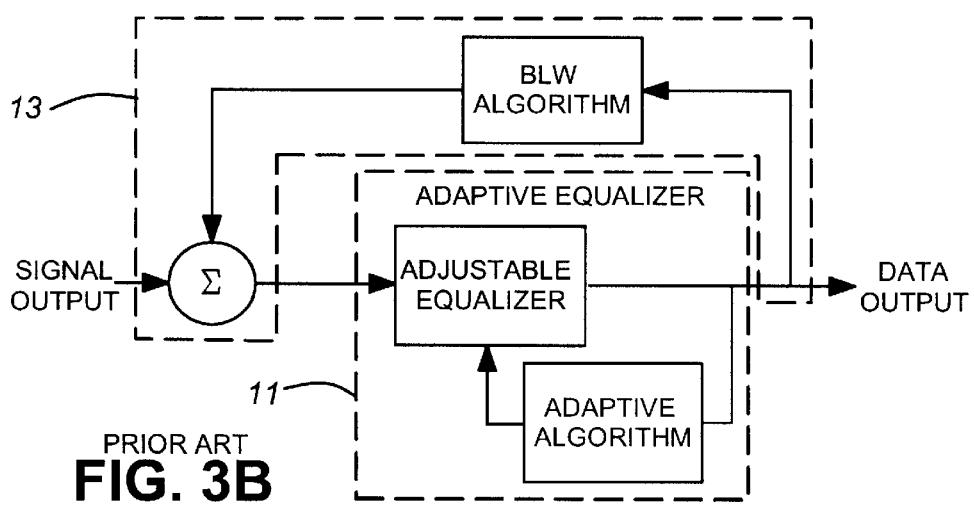
Figure 3C:
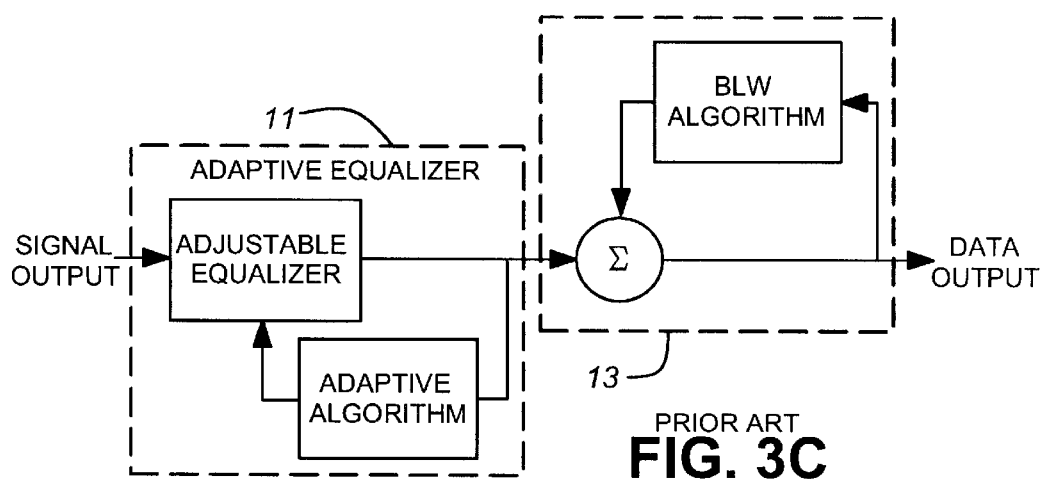

Because the main driver 15 and the correction driver 17 operate in vastly different modes (main driver 15 is a high-speed open-loop driver while correction driver 17 is a low-speed closed-loop driver) they may be constructed in very different ways, and they may be optimized separately for power, circuit complexity, circuit accuracy and layout area. In order to save on-chip power, correction driver 17 may also be constructed so that it has a maximum available output current that is less than that of the driver 15. For example, if it is desired to correct for a complete BLW event, where the voltage across the transformers has completely collapsed, correction driver 17 needs to have the same available maximum output current as driver 15. This is similar to the doubled linear range requirement of FIG. 3C. If, on the other hand, the BLW correction circuit only needs to correct for shorter-term wander events (for example, 100 bits of 0's in the middle of balanced data), correction driver 17 may be made much smaller. In order to compensate for 100 bits of 0's in a 155 Mbit/s ATM NRZ signal over 100-ohm UTP-5 cable with 350 $\mu$H OCL transformers, the correction driver 17 only needs to be able to output 10% of the current of driver 15. Minimizing the power of correction driver 17 also minimizes its layout area. In any event, lumped series resistance R of the cable places a limit on the effectiveness of this transmit BLW correction technique, as shown by the equation below, and therefore places a limit on how strong the correction driver 17 needs to be.

$$\omega_p = \frac{R}{L4} \cdot \frac{RX}{R+RX} \qquad \text{EQ C-4}$$

Comparing FIGS. 4 and 5, we see that elements 15, 17, 29 and 31 are identical. However, FIG. 5 senses the receiver's voltage directly at the transmitter output and therefore does not require a ternary winding on the transmit transformer. As a result, it can use the same off-chip components as a simple transmitter and is therefore significantly cheaper to use than FIG. 4. In addition, FIG. 5 uses a sample-and-hold circuit in place of a reference transmitter, therefore removing dependencies on looped series resistance or termination mismatches. In contrast, FIG. 4 requires an adaptation loop to trim the reference transmitter to accomplish the same end.

We have determined that for low frequency signals, i.e. those which cause the Baseline Wander event, it is a valid assumption to assume that the coupling coefficient of the transformer is unity. Below is our mathematical analysis of the prior art circuit of FIG. 4.

In doing this, however, we make the simplifying assumption that at low frequencies the twisted-pair cable can adequately be represented as a lumped resistance, and not as a transmission line. The propagation speed of light is approximately 3 ns per meter in free space, and the analysis below makes the very rough approximation that the propagation speed of electricity on a transmission line is half that, or 6 ns per meter. For 100 m of cable (the maximum for Fast Ethernet, 100BaseTX), this then results in a propagation time of 600 ns, corresponding to a frequency of 1.667 Mhz. An approximation of the maximum frequency for making a lumped approximation is one tenth of this frequency, or 166 kHz. With a standard 350 $\mu$H OCL transformer (used for 100BaseTX Ethernet), and a 100 ohm characteristic impedance (UTP-3 or UTP-5 cable), the low-frequency corner is approximately 45 kHz, approximately four times less than the maximum frequency limit for making the lumped approximation. This indicates that 100 m of UTP-5 cable may be replaced with a lumped 22-ohm resistor, the maximum resistance according to the ANSI/TIA/EIA-568-A specifications.

Figure 6:
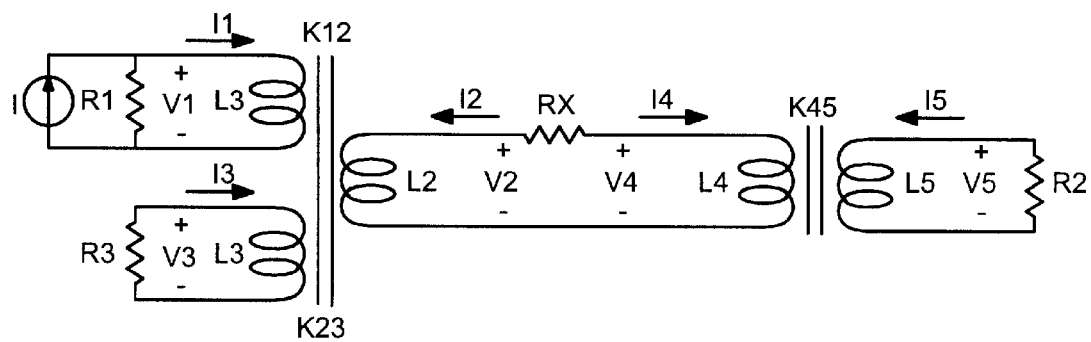
FIG. 6 is a Norton equivalent circuit of a transformer coupled system in which a ternary winding of the transmitter transformer is used to sense the BLW at the receiver in accordance with the prior art.

Taking this into account, FIG. 6 shows a transformer-coupled system where a ternary winding off the transmitter transformer is used to sense the BLW at the receiver.

The transmit transformer is formed by L1, L2, and L3, while the receive transformer is formed by L4 and L5. The cable is represented by RX. The transmitted voltage is at R1, the received voltage is at R2, and the feedback voltage is at R3.

The equations describing the performance of this system are given by equations EQ B-1 below:

| | | |
|---|---|---|
| V1=s'L1'I1+s'M12'I2+s'M13'I3 | V1=R1'(I-II) | M12=K12'$\sqrt{L1 \cdot L2}$ |
| V2=s'M12'I1+s'L2'I2+s'M23'I3 | V2=V4+RX'I4 | M13=K13'$\sqrt{L1 \cdot L3}$ |
| V3=s'M13'I1+s'M23'I2+s'L3'I3 | V3=−R3'I3 | M23=K23'$\sqrt{L2 \cdot L3}$ |
| V4=s'L4'I4+s'M45'I5 | I4=−I2 | M45=K45'$\sqrt{L4 \cdot L5}$ |
| V5=s'M45'I4+s'L5'I5 | V5=−R2'I5 | |

The solution of this system of equations is only practical by assuming that both transformers are ideal (i.e. K12=K13=K23=K45=1) and are 1:1 (i.e. L2=L3=L1 and L5=L4), and also that the transmitter and receiver are both properly terminated (i.e. R1=R2=R3=R). If the latter two assumptions were not made, the resulting conclusions would still hold, but the expressions would be more difficult to follow.

After making these assumptions, we end up with the following expressions EQ B-2:

$$V1 = I \cdot R \cdot \frac{s \cdot L1 \cdot (R \cdot RX + s \cdot L4 \cdot (R + RX))}{s^2 L1 \cdot L4 \cdot (3 \cdot R + 2 \cdot RX) + s \cdot R \cdot (L1 \cdot (R + 2 \cdot RX) + L4 \cdot (R + RX)) + R^2 \cdot RX}$$

$$V3 = I \cdot R \cdot \frac{s \cdot L1 \cdot (R \cdot RX + s \cdot L4 \cdot (R + RX))}{s^2 L1 \cdot L4 \cdot (3 \cdot R + 2 \cdot RX) + s \cdot R \cdot (L1 \cdot (R + 2 \cdot RX) + L4 \cdot (R + RX)) + R^2 \cdot RX}$$

$$V5 = I \cdot R \cdot \frac{s^2 \cdot L1 \cdot (L4 \cdot R)}{s^2 \cdot L1 \cdot L4 \cdot (3 \cdot R + 2 \cdot RX) + s \cdot R \cdot (L1 \cdot (R + 2 \cdot RX) + L4 \cdot (R + RX)) + R^2 \cdot RX}$$

Examining these, we see that V1 and V3 are identical. This shows that the ternary winding is not necessary, and in accordance with another embodiment of the invention, we substitute a two-winding transformer in place of transformer 21 of the prior art circuit of FIG. 4. This will be described in more detail later, with regard to FIG. 8.

Since we are attempting to sense the BLW at R2 (V5) (FIG. 6) via the voltage at R3 (V3), the transfer function EQ B-3 below from V3 to V5 is of interest:

$$H35 = \frac{V5}{V3} = \frac{I \cdot R \cdot \frac{s \cdot L1 \cdot L4 \cdot R}{s^2 \cdot L1 \cdot L4 \cdot (3 \cdot R + 2 \cdot RX) + s \cdot R \cdot (L1 \cdot (R + 2 \cdot RX) + L4 \cdot (R + RX)) + R^2 \cdot RX}}{I \cdot R \cdot \frac{s \cdot L1 \cdot (R \cdot RX + s \cdot L4 \cdot (R + RX))}{s^2 \cdot L1 \cdot L4 \cdot (3 \cdot R + 2 \cdot RX) + s \cdot R \cdot (L1 \cdot (R + 2 \cdot RX) + L4 \cdot (R + RX)) + R^2 RX}}$$

$$= \frac{s \cdot L4 \cdot R}{s \cdot L4 \cdot (R + RX) + R \cdot RX}$$

If RX were zero, i.e. there were no series cable resistance, H35 would simplify to unity, indicating that we can indeed sense the BLW event at V5 by sensing the voltage at V3. However, in the presence of series cable resistance RX, we have a limit placed upon our ability to sense BLW at V5 by sensing the voltage at V3. EQ B-3 has a zero at DC, and a pole at:

$$\omega_p = \frac{R}{L4} \cdot \frac{RX}{R + RX} \quad \text{EQ B-4}$$

This places a limit on the frequency band over which we can compensate for BLW at R2 (V5) by sensing the voltage on R3 (V3). However, for 100 m of UTP-5 cable we know the maximum value of RX is 22 ohms, and the value for R is 100 ohms. This means that transmit BLW correction can reduce the low-frequency corner of the transformer-coupled system by (100+22)/22, or approximately 6, effectively increasing the OCL of the transformer by 6. If the low-frequency cutoff is maintained, this would allow the transformer OCL to be decreased by a factor of 6, increasing the upper cutoff frequency of the system by 6 without requiring higher-quality transformers. It is important to note that the BLW event created by a killer packet has frequency components down in the hundreds of Hertz. EQ B-4 for 100 m of UTP-5 cable and 350 uH OCL transformers is approximately 8.2 kHz, not low enough to completely compensate for a killer packet.

Another effect of series cable resistance appears in the high-frequency gain of EQ B-3, given by:

$$H35\Big|_{s \to \infty} = \frac{R}{R + RX} \quad \text{EQ B-5}$$

RX effectively appears in series with R2, increasing its effective resistance and decreasing the effective gain. If the transmitter BLW circuit does not compensate for this, it will effectively insert BLW where none should have existed in the first place.

As noted above, we have determined that we can dispense with the ternary winding of the transmit transformer and sense the BLW directly at the outputs. This is a major advance in the art, since it provides a substantial cost reduction of the circuit of FIG. 4.

Figure 7:
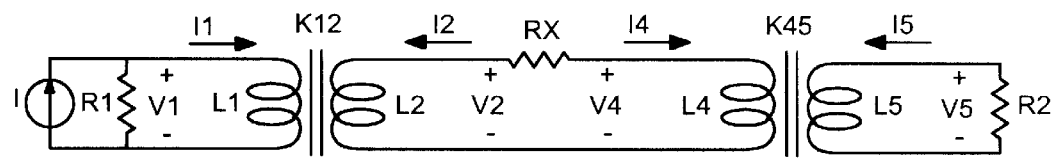
FIG. 7 is a Norton equivalent circuit of a transformer coupled system in accordance with an embodiment of the invention using a two winding transformer.

FIG. 7 shows the effective circuit for this embodiment whose performance equations EQ C-1 are given by:

$$V1 = s \cdot L1 \cdot I1 + s \cdot M12 \cdot I2 \quad V1 = R1 \cdot (I - I1)$$

$$V2 = s \cdot M12 \cdot I1 + s \cdot L2 \cdot I2 \quad V2 = V4 + RX \cdot I4 \quad M12 = K12 \cdot \sqrt{L1 \cdot L2}$$

$$V4 = s \cdot L4 \cdot I4 + s \cdot M45 \cdot I5 \quad I4 = -I2 \quad M45 = K45 \cdot \sqrt{L4 \cdot L5}$$

$$V5 = s \cdot M45 \cdot I4 + s \cdot L5 \cdot I5 \quad V5 = -R2 \cdot I5$$

Making the same simplifications as before, we derive the following equations EQ C-2 for V1 and V5:

$$V1 = I \cdot R \cdot \frac{s \cdot L1 \cdot (R \cdot RX + s \cdot L4 \cdot (R + RX))}{s^2 \cdot L1 \cdot L4 \cdot (2 \cdot R + RX) + s \cdot R \cdot (L1 + L4) \cdot (R + RX) + R^2 \cdot RX}$$

$$V5 = I \cdot R \cdot \frac{s \cdot L1 \cdot L4 \cdot R}{s^2 \cdot L1 \cdot L4 \cdot (2 \cdot R + RX) + s \cdot R \cdot (L1 + L4) \cdot (R + RX) + R^2 \cdot RX}$$

From this, we derive the transfer function from the transmitter to the output:

$$H15 = \frac{V5}{V1} = \frac{I \cdot R \cdot \frac{s \cdot L1 \cdot L4 \cdot R}{s^2 \cdot L1 \cdot L4 \cdot (2 \cdot R + RX) + s \cdot R \cdot (L1 + L4) \cdot (R + RX) + R^2 \cdot RX}}{I \cdot R \cdot \frac{s \cdot L1 \cdot (R \cdot RX + s \cdot L4 \cdot (R + RX))}{s^2 \cdot L1 \cdot L4 \cdot (2 \cdot R + RX) + s \cdot R \cdot (L1 + L4)(R + RX) + R^2 \cdot RX}}$$

$$= \frac{s \cdot L4 \cdot R}{s \cdot L4 \cdot (R + RX) + R \cdot RX}$$

EQ C-3

Comparing H15 in EQ C-3 to H35 in EQ B-3, we see they are identical. Therefore, we may draw the same conclusions about the effect of series resistance RX as we did for equations B-4 and B-5. RX will result in an effective limit to the transmit BLW correction possible, and will introduce a non-unity high-frequency gain factor between the transmitter and the receiver that will have to be compensated for.

$$\omega_p = \frac{R}{L4} \cdot \frac{RX}{R + RX} \quad \text{EQ C-4}$$

$$H15\Big|_{s \to \infty} = \frac{R}{R + RX} \quad \text{EQ C-5}$$

However, at the same time, we realize that sensing the receiver voltage by examining the transmitter output voltage (FIG. 7) is equally as valid as sensing the receiver voltage by examining a feedback term from a ternary winding of the transmit transformer (FIG. 6).

Figure 8:
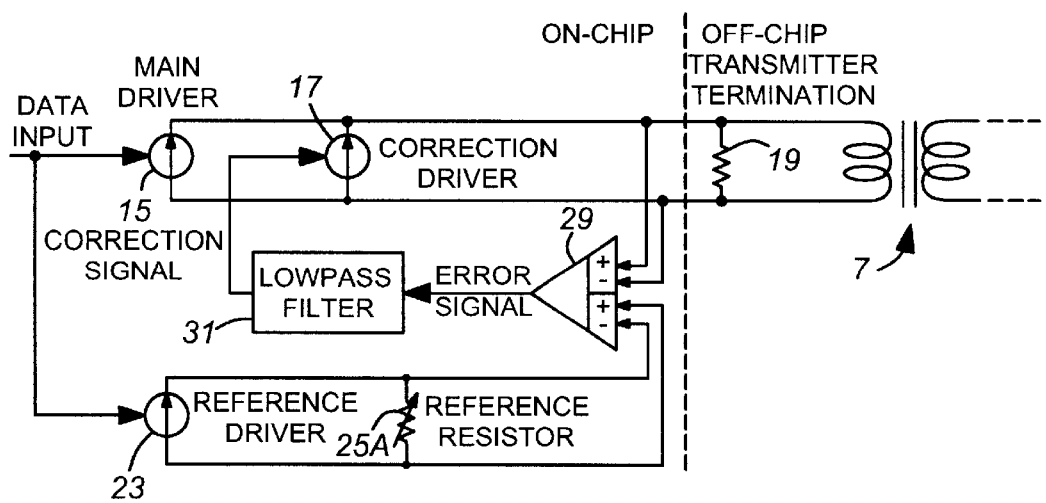
FIG. 8 is a schematic diagram of a transmitter baseline wander correction configuration in accordance with another embodiment of the invention.

An embodiment of the invention that utilizes the principles described above with reference FIG. 7, but sensing the transmitter output to compensate for receiver BLW, but again uses an on-chip reference transmitter instead of the sample-and-hold circuit, is shown in FIG. 8.

The corresponding elements of FIG. 4 and FIG. 8 are given similar reference numerals. FIG. 8 requires an on-chip adaptive loop reference driver 23 and resistor 25A (resistor 25A is drawn as a variable resistance in this Figure), but uses the same off-chip components as a simple transmitter.

The circuit of FIG. 8 operates substantially the same as the prior art circuit of FIG. 4, except that the sensing signal which is applied to the error amplifier 29 from the transformer is obtained from across the primary winding, instead of across a ternary winding as was required in the prior art. We have discovered this to be valid in the discussion above. The same off-chip components as a simple transmitter are required, and the cost is thereby substantially less than that of the prior art circuit of FIG. 4, since only a two winding transformer, instead of a three winding transformer, is required in our invention.

A person understanding this invention may now conceive of alternate embodiments and enhancements using the principles described herein. All such embodiments and enhancements are considered to be within the spirit and scope of this invention as defined in the claims appended hereto.

We claim:

1. A circuit for correcting baseline wander in a transmitter which is comprised of a main signal current driver driving a first winding of a two-winding transformer wherein the first winding is in parallel with a termination impedance matching load, comprising:
    (a) a compensation current driver coupled in parallel with the main signal current driver for adding its current to current of the main signal current driver, and having a correction signal control input,
    (b) a sample-and-hold circuit connected across the first winding,
    (c) an error amplifier having a first pair of inputs connected across the first winding and a second pair of inputs connected to the output of the sample-and-hold circuit, for providing an error signal resulting from a difference of signals appearing at its respective pairs of inputs, and
    (d) a circuit for applying the error signal to the correction signal control input of the compensation current driver, whereby any difference between a present signal carried by the first winding of the transformer, and a past signal held by the sample-and-hold circuit results in the error signal and generation of a correcting current by the compensation current driver so as to substantially eliminate said difference.

2. A circuit as defined in claim 1, in which the sample-and-hold circuit is synchronized to input data which forms an input signal driving the main signal current driver.

3. A circuit as defined in claim 2, in which the circuit for applying the error signal to the correction signal control input of the compensation current driver is comprised of a low pass filter.

4. A circuit as defined in claim 3 in which the main signal current driver is a high-speed open-loop driver, and the compensation current driver is a low-speed closed-loop driver.

5. A circuit for correcting baseline wander in a transmitter which is comprised of
    (a) a main signal current driver driving a first winding of a transformer, the transformer being restricted to having two windings,
    (b) a termination impedance-matching load being in parallel with the first winding of the two-winding transformer,
    (c) a compensation current driver coupled in parallel with the main signal current driver, having a correction signal control input, for adding its current to current of the main signal current driver,
    (d) a reference current driver having a control input coupled in parallel with a control input of the main signal current driver for receiving an input signal,
    (e) a reference resistor connected across the output of the reference current driver,
    (f) an error amplifier having a first pair of inputs connected across the first winding and a second pair of inputs connected across the output of the reference current driver, for providing an error signal resulting from a difference of signals appearing at its respective pairs of inputs, and
    (g) a circuit for applying the error signal to the correction signal control input of the compensation current driver.

6. A circuit as defined in claim 5, in which the circuit for applying the error signal to the correction signal control input of the compensation current driver is comprised of a low pass filter.

7. A method of compensating for baseline data signal drift of an ongoing signal comprising sampling the ongoing signal and holding the sample, comparing the sampled signal with the ongoing signal at a time later than the sampling time and deriving a difference signal, and correcting the ongoing signal in a direction so as to substantially eliminate the difference signal, in which the ongoing signal is a data signal, and including synchronizing the sampling and holding with timing of the data in the ongoing signal, and including comparing the sampled and ongoing signals in a comparator, and controlling a signal compensation driver by a low pass filtered output signal of the comparator for compensating the ongoing signal so as to substantially eliminate the difference signal.

8. A method as defined in claim 7 including applying the ongoing signal to one winding of a two-winding transformer, and sampling the signal across one of the two windings of the transformer.

9. A method as defined in claim 7 including sampling the ongoing signal across one winding of a transformer.

* * * * *